US012422189B2

(12) United States Patent
Sun et al.

(10) Patent No.: US 12,422,189 B2
(45) Date of Patent: *Sep. 23, 2025

(54) MATERIAL DRYING AND COOLING INTEGRATED MACHINE

(71) Applicant: GUANGZHOU JP.EPE.CO., LTD., Guangdong (CN)

(72) Inventors: Shaotang Sun, Guangdong (CN); Longbing Wu, Guangdong (CN)

(73) Assignee: GUANGZHOU JP.EPE.CO., LTD., Guangdong (CN)

( * ) Notice: Subject to any disclaimer, the term of this patent is extended or adjusted under 35 U.S.C. 154(b) by 466 days.

This patent is subject to a terminal disclaimer.

(21) Appl. No.: 17/758,703

(22) PCT Filed: Dec. 8, 2020

(86) PCT No.: PCT/CN2020/134465
§ 371 (c)(1),
(2) Date: Jul. 13, 2022

(87) PCT Pub. No.: WO2021/227464
PCT Pub. Date: Nov. 18, 2021

(65) Prior Publication Data
US 2023/0074336 A1    Mar. 9, 2023

(30) Foreign Application Priority Data
May 15, 2020    (CN) .......................... 202010414316.0

(51) Int. Cl.
*F26B 17/04*    (2006.01)
*F26B 21/08*    (2006.01)
(Continued)

(52) U.S. Cl.
CPC ............ *F26B 17/04* (2013.01); *F26B 21/086* (2013.01); *F26B 21/10* (2013.01); *F26B 25/007* (2013.01)

(58) Field of Classification Search
CPC ........ F26B 17/04; F26B 21/086; F26B 21/10; F26B 25/007
(Continued)

(56) References Cited

U.S. PATENT DOCUMENTS 6,163,976 A * 12/2000 Tada ....................... F26B 5/041
34/92
6,581,394 B1 * 6/2003 Smolenskiy ......... B01D 53/265
62/402
(Continued)

FOREIGN PATENT DOCUMENTS

CN    104061766       9/2014
CN    204085115 U     1/2015
(Continued)

OTHER PUBLICATIONS

International Search Report issued in PCT/CN2020/134465 dated Feb. 25, 2021.

*Primary Examiner* — Stephen M Gravini
(74) *Attorney, Agent, or Firm* — DLA PIPER LLP (US)

(57) ABSTRACT

A material drying and cooling integrated machine, comprising a heating module, a drying module, a dust removal filter module, a temperature-lowering and dehumidifying module, and a cooling module. Dry hot air generated in the heating module can enter the drying module to dry materials; the temperature-lowering and dehumidifying module can conduct temperature lowering and dehumidification on air entering the interior thereof so as to form dry cold air, and the dry cold air can enter the cooling module to cool materials in the cooling module; the dry hot air enters the drying module to dry the materials in the drying module, then damp hot air is formed, and part of the damp hot air can be heated by the heating module again; the other part of the damp hot air can sequentially pass through the dust removal
(Continued)

filter module and the temperature-lowering and dehumidifying module, and dry cold air can be formed.

20 Claims, 4 Drawing Sheets

(51) Int. Cl.
    *F26B 21/10*     (2006.01)
    *F26B 25/00*     (2006.01)

(58) Field of Classification Search
    USPC .............................................................. 34/62
    See application file for complete search history.

(56) References Cited

U.S. PATENT DOCUMENTS

| | | | | |
|---|---|---|---|---|
| 10,914,477 | B2 * | 2/2021 | Braun | F24F 3/14 |
| 10,974,191 | B2 * | 4/2021 | Yuan | B01D 46/00 |
| 11,435,140 | B2 * | 9/2022 | Tanaka | F26B 9/063 |
| 11,800,690 | B1 * | 10/2023 | Osterkamp | F26B 21/086 |
| 11,852,410 | B2 * | 12/2023 | Li | B01D 46/121 |
| 12,130,083 | B1 * | 10/2024 | Goldberg | F26B 3/0923 |
| 2005/0120715 | A1 * | 6/2005 | Labrador | F03G 7/00 |
| | | | | 60/618 |
| 2023/0074336 | A1 * | 3/2023 | Sun | F26B 23/002 |
| 2023/0128608 | A1 * | 4/2023 | Sun | F26B 21/001 |
| | | | | 34/74 |
| 2024/0180065 | A1 * | 6/2024 | Pietersz | A01C 1/02 |
| 2025/0075975 | A1 * | 3/2025 | Chen | F26B 3/16 |

FOREIGN PATENT DOCUMENTS

| | | | | |
|---|---|---|---|---|
| CN | 108168232 | A | 6/2018 | |
| CN | 109883180 | | 6/2019 | |
| CN | 109883180 | A | 6/2019 | |
| CN | 210512530 | U | 5/2020 | |
| CN | 111578670 | A * | 8/2020 | A23N 17/00 |
| CN | 111578671 | A | 8/2020 | |
| CN | 111707085 | A | 9/2020 | |
| CN | 111707086 | A | 9/2020 | |
| DE | 112020005882 | T5 * | 11/2022 | A23N 17/00 |
| EP | 2647935 | A1 | 10/2013 | |
| JP | 2015232405 | A | 12/2015 | |
| WO | WO-2021227464 | A1 * | 11/2021 | A23N 17/00 |

* cited by examiner

MATERIAL DRYING AND COOLING INTEGRATED MACHINE

CROSS REFERENCE TO RELATED APPLICATION

This patent application is a national stage application of PCT/CN2020/134465, filed Dec. 8, 2020, which claims the priority of Chinese Patent Application No. 202010414316.0, filed on May 15, 2020, the disclosure of which is incorporated by reference herein in its entirety as part of the present application.

TECHNICAL FIELD

The present disclosure relates to the technical field of material production, in particular to a material drying and cooling integrated machine.

BACKGROUND ART

With continuous improvement of living standards of people, the demand for poultry meat products is increasing. Therefore, rapid development is brought to the breeding industry, and correspondingly the development of feed industry is promoted.

In the feed production process, a large amount of damp hot waste gas is generated in the drying step of the feed drying process. The damp hot waste gas with unpleasant smell is directly exhausted into the atmosphere, resulting in great pollution to the atmospheric environment.

SUMMARY

The present disclosure provides a material drying and cooling integrated machine. Feed can be dried and cooled at the same time, so that waste gas is avoided from being exhausted to the atmosphere.

In an embodiment, the material drying and cooling integrated machine comprises a heating module, a drying module, a dust removal filter module, a temperature-lowering and dehumidifying module, and a cooling module;
  dry hot air generated in the heating module can enter the drying module to dry materials in the drying module;
  the dust removal filter module can conduct dust removal on air entering the interior thereof; the temperature-lowering and dehumidifying module can conduct temperature lowering and dehumidification on air entering the interior thereof so as to form dry cold air, and the dry cold air can enter the cooling module to cool materials in the cooling module;
  the dry hot air enters the drying module to dry the materials in the drying module, then damp hot air is formed, the damp hot air can enter the heating module, and part of the damp hot air can be heated by the heating module again and then enter the drying module; and the other part of the damp hot air can sequentially pass through the dust removal filter module and the temperature-lowering and dehumidifying module, dry cold air can be formed, and the dry cold air can enter the cooling module.

Optionally, the dry cold air is heated by the materials in the cooling module while the materials in the cooling module are cooled, and then enters the heating module through the drying module.

Optionally, the material drying and cooling integrated machine further comprises a return air duct, wherein one end of the return air duct can communicate with the drying module, and the other end of the return air duct communicates with the cooling module; and
  the dry cold air heated by the materials in the cooling module can enter the drying module through the return air duct.

Optionally, the temperature-lowering and dehumidifying module comprises a first-stage surface cooler and a second-stage surface cooler, the material drying and cooling equipment further comprises a first cooling medium supply part and a second cooling medium supply part, the first cooling medium supply part is used for supplying a cooling medium to the first-stage surface cooler, and the second cooling medium supply part is used for supplying a cooling medium to the second-stage surface cooler; and
  the material drying and cooling equipment further comprises a switching part, and the switching part can switch the second cooling medium supply part to supply the cooling medium to the first-stage surface cooler and switch the first cooling medium supply part to supply the cooling medium to the second-stage surface cooler.

Optionally, the material drying and cooling integrated machine further comprises a dehumidifying air duct, wherein one end of the dehumidifying air duct can communicate with the heating module, and the other end of the dehumidifying air duct communicates with the dust removal filter module; and
  the damp hot air entering the dust removal filter module can enter the dust removal filter module through the dehumidifying air duct.

Optionally, a dehumidifying air duct air door adjusting valve is arranged at the joint of the heating module and the dehumidifying air duct, and can adjust whether the dehumidifying air duct pipe communicates with the heating module or not.

Optionally, the cooling module is a vertical cooling machine module, the vertical cooling machine module comprises a feeding valve and a cooling box body, the materials dried by the drying module can enter the cooling box body through the feeding valve, and the cooling box body can cool the materials.

Optionally, the cooling module is a horizontal cooling machine module, the horizontal cooling machine module comprises a homogenizer and cooling box body modules, the materials dried by the drying module can enter the cooling box body modules through the homogenizer, and the cooling box body modules can cool the materials.

Optionally, the material drying and cooling integrated machine further comprises a material conveying pipeline, wherein one end of the material conveying pipeline can communicate with the drying module, and the other end of the material conveying pipeline communicates with the cooling module; and
  the materials dried by the drying module can enter the cooling module through the material conveying pipeline.

Optionally, the dust removal filter module comprises a dust removal box body and a dehumidifying and cooling fan, and the air entering the dust removal filter module sequentially passes through the dust removal box body and the dehumidifying and cooling fan.

According to the material drying and cooling integrated machine provided by the present disclosure, the heating module is arranged to generate the dry hot air, and the dry hot air enters the drying module to dry the material in the drying module; and the temperature-lowering and dehumidifying module is arranged to generate the dry cold air, and the dry cold air enters the cooling module to cool the materials in the cooling module.

In the present disclosure, the damp hot air generated in the drying module can enter the heating module, and part of the damp hot air is reprocessed by the heating module to form hot dry air, and enters the heating module again to heat the materials. The other part of the damp hot air passes through the dust removal filter module and the temperature-lowering and dehumidifying module sequentially, the dry cold air is formed, and then the dry cold air enters the cooling module. The damp hot air generated after the drying module dries the materials is reprocessed, so that the damp hot air is avoided from being directly exhausted into the atmosphere to pollute the environment, zero discharge of waste gas is realized, and the drying and cooling production process and environmental protection treatment are integrated.

Figure 1:
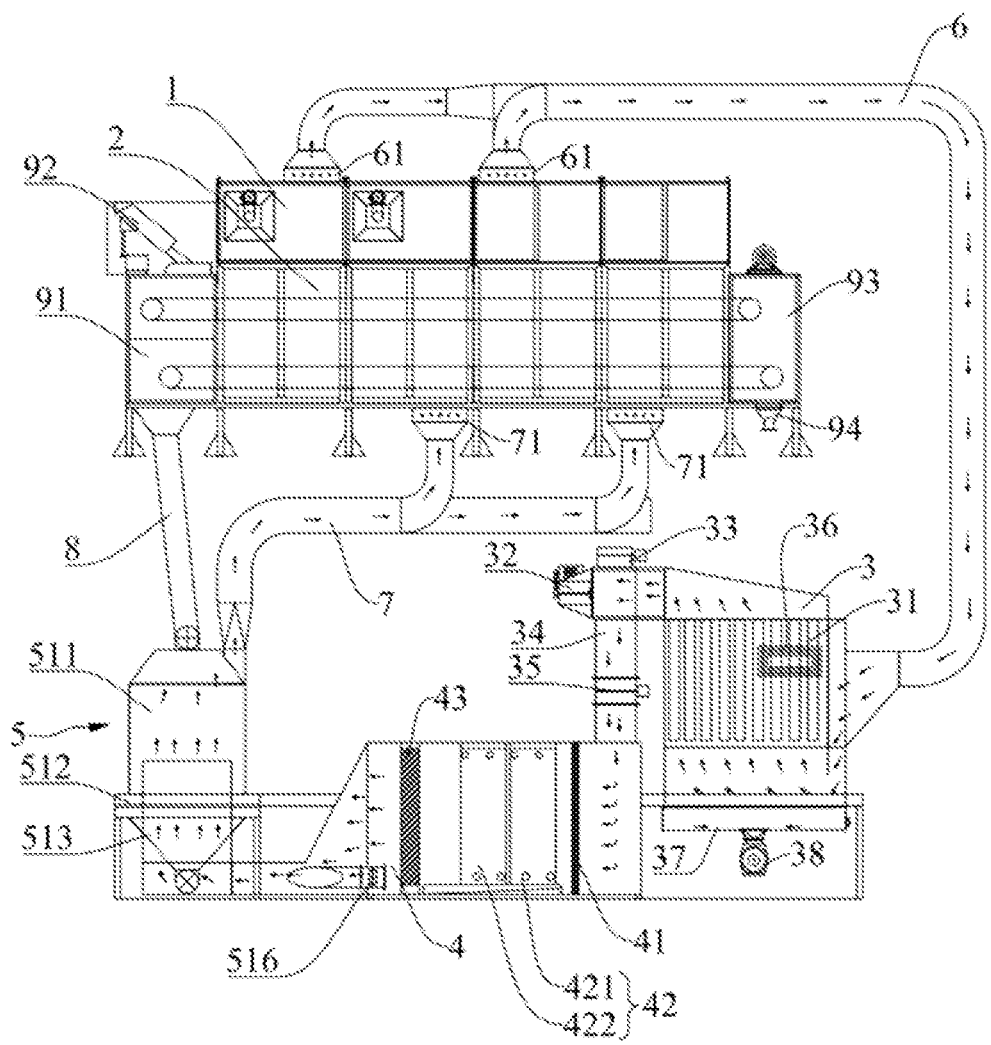
FIG. 1 is a front view of a material drying and cooling integrated machine provided by the first embodiment of the present disclosure.

REFERENCE SIGNS 1, heating module; 111, first primary filter device; 112, first secondary filter device; 12, condenser; 13, heat exchanger; 14, drying and circulating fan; 15, dehumidifying air door adjusting valve; 16, heat pump system module;
2, drying module; 21, first drying module air duct; 211, first opening; 22, first dry material conveying mesh belt; 23, second dry material conveying mesh belt; 24, second drying module air duct; 241, second opening; 242, third opening;
3, dust removal filter module; 31, dust removal box body; 32, dehumidifying and cooling fan; 33, exhaust valve; 34, connecting pipeline; 35, shut-off valve; 36, explosion-proof device; 37, waste screw auger conveyor; 38, waste material discharge valve;
4, temperature-lowering and dehumidifying module; 41, second filter device; 42, surface cooler assembly; 421, first-stage surface cooler; 422, second-stage surface cooler; 43, heat regenerator;
5, cooling module;
511, cooling box body; 512, material discharge mechanism; 513, vertical cooling box body inlet air duct; 514, blanking hopper; 515, closed-air material discharge valve; 516, air supplementing device; 517, feed valve; 521, homogenizer; 522, cooling and feeding box; 523, cooling box body module; 524, cooling tail box; 525, air outlet adjusting valve; 526, material conveying and driving device; 527, material conveying mechanism; 528, waste conveyor; 529, horizontal cooling box body inlet air duct;
6, dehumidifying air duct; 61, dehumidifying air duct air door adjusting valve;
7, return air duct; 71, return air adjusting valve;
8, material conveying pipeline;
91, feeding box body; 92, distributing device; 93, tail box; and 94, waste screw conveyor.

DETAILED DESCRIPTION OF THE EMBODIMENTS

In the description of the present disclosure, it needs to be illustrated that the indicative direction or position relations of the terms such as "center", "upper", "lower", "left", "right", "vertical", "horizontal", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first" and "second" are just used for distinguishing the description, but cannot be understood to indicate or hint relative importance. Wherein, the terms "first position" and "second position" are two different positions.

In the description of the present disclosure, it needs to be illustrated that, except as otherwise noted, the terms such as "install", "link" and "connect" should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally. For any person skilled in the art, the specific meanings of the terms in the present disclosure can be understood according to specific conditions.

Embodiment I

Figure 2:
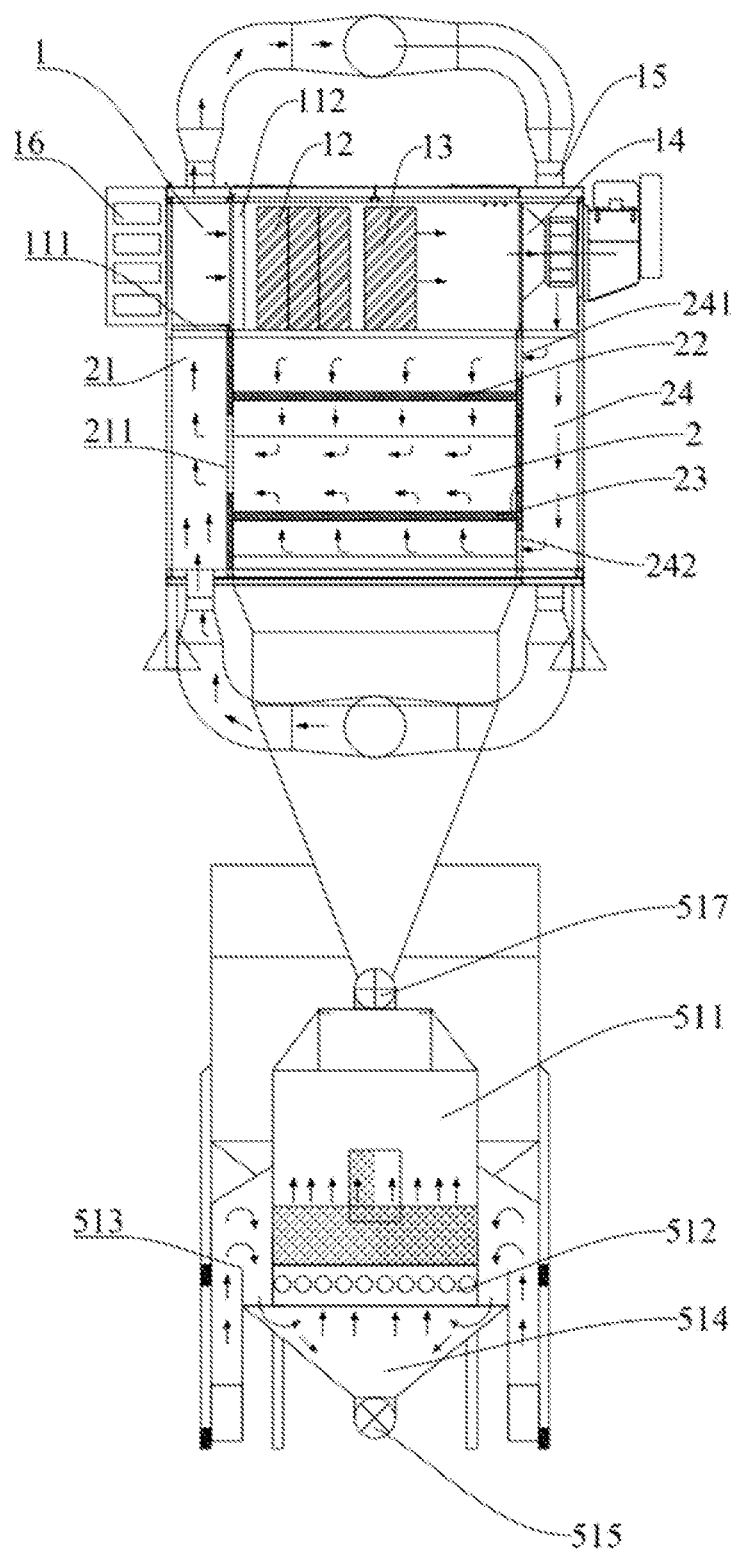
FIG. 2 is an internal structural schematic diagram of a material drying and cooling integrated machine in the side-looking direction provided by the first embodiment of the present disclosure.

Referring to FIG. 1 and FIG. 2, the embodiment provides a material drying and cooling integrated machine. Materials can be dried and cooled, and damp hot air generated in the drying process can be recycled to avoid polluting the environment after the damp hot air is exhausted to the atmosphere. Arrows in the figures indicate the direction of gas flow.

In the embodiment, the material drying and cooling equipment is used for drying and cooling feed.

In the embodiment, the material drying and cooling integrated machine comprises a heating module 1, a drying module 2, a dust removal filter module 3, a temperature-lowering and dehumidifying module 4, and a cooling module 5.

Dry hot air generated in the heating module 1 can enter the drying module 2 to dry materials in the drying module 2; the dust removal filter module 3 can conduct dust removal on air entering the interior thereof; the temperature-lowering and dehumidifying module 4 can conduct temperature lowering and dehumidification on air entering the interior thereof so as to form dry cold air, and the dry cold air can enter the cooling module 5 to cool materials in the cooling module 5; and the materials dried by the drying module 2 can enter the cooling module 5.

The dry hot air enters the drying module 2 to dry the materials in the drying module 2, and then damp hot air is formed. The damp hot air can enter the heating module 1, and part of the damp hot air can be heated by the heating module 1 again and then enter the drying module 2; and the other part of the damp hot air can sequentially pass through the dust removal filter module 3 and the temperature-lowering and dehumidifying module 4, the dry cold air can be formed, and the dry clod air can enter the cooling module 5.

In the embodiment, the heating module 1 is arranged to generate the dry hot air, and the dry hot air enters the drying module 2 to dry the material in the drying module 2; and the temperature-lowering and dehumidifying module 4 is arranged to generate the dry cold air, and the dry cold air enters the cooling module 5 to cool the materials in the cooling module 5.

The drying module 2 treats and uses the damp hot air generated after the materials are dried again, so that the damp hot air is avoided from being directly exhausted into the atmosphere to pollute the environment. Meanwhile, the production process of drying and cooling and the waste gas treatment process are integrated, and the functions of the material drying and cooling integrated machine are enriched.

In the embodiment, the material drying and cooling integrated machine further comprises a feeding box body 91, and the feeding box body 91 is located at the front end of the drying module 2. A distributing device 92 is arranged above the feeding box body 91. Optionally, in the embodiment, the distributing device 92 is provided with a sealing structure. A tail box 93 is arranged at the rear end of the drying module 2. Optionally, a waste screw conveyor 94 is arranged at the tail box 93.

In order to avoid waste of energy, the dry cold air cools the materials in the cooling module 5 while being heated by the materials in the cooling module 5, and then can enter the heating module 1 through the drying module 2. Through the arrangement, on one hand, waste of energy is avoided; and on the other hand, the gas for cooling the materials can be avoided from being directly exhausted into the atmosphere to pollute the environment.

In the embodiment, the material drying and cooling integrated machine further comprises a return air duct 7. One end of the return air duct 7 can communicate with the drying module 2, and the other end of the return air duct 7 communicates with the cooling module 5. The dry cold air heated by the materials in the cooling module 5 can enter the drying module 2 through the return air duct 7.

In order to control the opening and closing of the return air duct 7, a return air adjusting valve 71 is arranged at the joint of the return air duct 7 and the drying module 2, and the return air adjusting valve 71 can adjust whether the return air duct 7 communicates with the drying module 2 or not.

In order to enable the damp hot air generated in the drying module 2 to enter the dust removal filter module 3, the material drying and cooling integrated machine further comprises a dehumidifying air duct 6. One end of the dehumidifying air duct 6 can communicate with the heating module 1, and the other end of the dehumidifying air duct 6 communicates with the dust removal filter module 3. The damp hot air entering the dust removal filter module 3 can enter the dust removal filter module 3 through the dehumidifying air duct 6.

In order to control the opening and closing of the dehumidifying air duct 6, a dehumidifying air duct air door adjusting valve 61 is arranged at the joint of the heating module 1 and the dehumidifying air duct 6, and the dehumidifying air duct air door adjusting valve 61 can adjust whether the dehumidifying air duct 6 communicates with the heating module 1 or not.

In order to enable the dried materials to enter the cooling module 5 to be cooled, in the present embodiment, the material drying and cooling integrated machine further comprises a material conveying pipeline 8. One end of the material conveying pipeline 8 communicates with the feeding box body 91, and the other end of the material conveying pipeline 8 communicates with the cooling module 5. The materials dried by the drying module 2 can enter the cooling module 5 through the material conveying pipeline 8.

In the embodiment, the heating module 1 is internally provided with a first filter device, and the first filter device is used for filtering the air entering the heating module 1. Optionally, the first filter device is arranged at an inlet of the heating module 1.

The first filter device comprises a first primary filter device 111 and a first secondary filter device 112. Optionally, in the embodiment, the first primary filter device 111 and the first secondary filter device 112 are arranged perpendicular to each other.

The damp hot air generated in the drying module 2 firstly enters the heating module 1 through the first primary filter device 111, and part of the damp hot air continues to enter the heating module 1 through the first secondary filter device 112. The first primary filter device 111 conducts primary filtration on the damp hot air to filter out impurities such as dust and feed carried in the damp hot air. The damp hot air subjected to primary filtration passes through the first secondary filter device 112 again to be filtered again, and continues to enter the heating module 1.

The other part of the damp hot air enters the dust removal filter module 3 through the dehumidifying air duct 6.

In order to heat and dehumidify the air in the heating module 1 to obtain dry hot air, in the present embodiment, the heating module 1 further comprises a condenser 12 and a heat exchanger 13, wherein the condenser 12 is used for dehumidifying; and the heat exchanger 13 is used for heating. Optionally, in the embodiment, the heat exchanger 12 is a steam heat exchanger. The gas sequentially passes through the first filter device, the condenser 12 and the heat exchanger 13 to form dry hot air.

In the embodiment, the heating module 1 further comprises a drying and circulating fan 14 and a dehumidifying air door adjusting valve 15. The drying and circulating fan 14 is used for blowing the dry hot air in the heating module 1 into the drying module 2. The dehumidifying air door adjusting valve 15 is arranged above the side air duct of the first filter device.

Referring to FIG. 2, the drying module 2 comprises a first drying module air duct 21, and the damp hot air generated in the drying module 2 can enter the heating module 1 through the first drying module air duct 21. A second drying module air duct 24 is further arranged in the drying module 2 on the side opposite to the first drying module air duct 21, and the drying and circulating fan 14 blows the dry hot air in the heating module 1 into the second drying module air duct 24.

The drying module 2 is further internally provided with a dry material conveying mesh belt. The drying and circulating fan 14 blows the dry hot air in the heating module 1 into the second drying module air duct 24. The dry hot air in the second drying module air duct 24 passes through the dry material conveying mesh belt.

Optionally, one end of the dry material conveying mesh belt is arranged in the feeding box body 91, and the other end is arranged in the tail box 93.

Optionally, in the embodiment, the dry material conveying mesh belt comprises a first dry material conveying mesh belt 22 and a second dry material conveying mesh belt 23 which are spaced up and down horizontally, and the materials on the first dry material conveying mesh belt 22 can be transferred to the second dry material conveying mesh belt 23. Exemplarily, the material drying and cooling device is further provided with a first drying device and a second diving device, wherein the first driving device is used for driving the first dry material conveying mesh belt 22; and the second drying device is used for drying the second dry material conveying mesh belt 23.

A first opening 211 is formed in the middle part of the first drying module air duct 21. The first opening 211 communicates the space between the first dry material conveying mesh belt 22 and the second dry material conveying mesh belt 23 with the first drying module air duct 21. A second opening 241 and a third opening 242 are formed in the second drying module air duct 24. The second opening 241 communicates the space above the first dry material conveying mesh belt 22 with the second drying module air duct 24. The third opening 242 communicates the space below the second dry material conveying mesh belt 23 with the second drying module air duct 24.

Through the arrangement, after the drying and circulating fan 14 blows the dry hot air in the heating module 1 into the second drying module air duct 24, part of the dry hot air in the second drying module air duct 24 enters the space above the first dry material conveying mesh belt 22 through the second opening 241 and passes through the first dry material conveying mesh belt 22 downwards to dry the materials on the first dry material conveying mesh belt 22, then enters the first drying module air duct 21 from the first opening 211, and then enters the heating module 1. The other part of the dry hot air in the second drying module air duct 24 enters the space below the second dry material conveying mesh belt 23 through the third opening 242 and passes through the second dry material conveying mesh belt 23 upwards to dry the materials on the second dry material conveying mesh belt 23, then enters the first drying module air duct 21 from the first opening 211 and then enters the heating module 1.

In the embodiment, a heat pump system module 16 is arranged outside the heating module 1, and the condenser 12 communicates with the heat pump system module 16.

In the embodiment, the dust removal filter module 3 comprises a dust removal box body 31 and a dehumidifying and cooling fan 32. The air entering the dust removal filter module 3 sequentially passes through the dust removal box body 31 and the dehumidifying and cooling fan 32. The dehumidifying and cooling fan 32 is installed on the dust removal box body 31.

In the embodiment, the dust removal filter module 3 further comprises an exhaust valve 33, a connecting pipeline 34, a shut-off valve 35, an explosion-proof device 36, a waste screw auger conveyor 37 and a waste material discharge valve 38.

In the embodiment, the explosion-proof device 36 is installed on the side surface of the dust removal box body 31. The exhaust valve 33 is arranged above the dehumidifying and cooling fan 32, and the shut-off valve 35 is arranged on the exhaust valve 33 and used for controlling the starting and stopping of the exhaust valve 33. The waste screw auger conveyor 37 is arranged on a hopper below the dust removal box body 31. The waste material discharge valve 38 is installed at the position of an outlet of the waste screw auger conveyor 37.

In the embodiment, the temperature-lowering and dehumidifying module 4 comprises a second filter device 41, and the second filter device 41 is used for filtering the air entering the temperature-lowering and dehumidifying module 4. Optionally, the second filter device 41 is arranged at an inlet of the temperature-lowering and dehumidifying module 4.

In the embodiment, the temperature-lowering and dehumidifying module 4 is internally provided with a surface cooler assembly 42 and a heat regenerator 43. The air entering the temperature-lowering and dehumidifying module 4 sequentially passes through the second filter device 41, the surface cooler assembly 42 and the heat regenerator 43.

In the embodiment, the surface cooler assembly 42 comprises a first-stage surface cooler 421 and a second-stage surface cooler 422. The material drying and cooling equipment further comprises a first cooling medium supply part and a second cooling medium supply part, wherein the first cooling medium supply part is used for supplying a cooling medium to the first-stage surface cooler 421; and the second cooling medium supply part is used for supplying a cooling medium to the second-stage surface cooler 422.

The material drying and cooling equipment further comprises a switching part. The switching part can switch the second cooling medium supply part to supply the cooling medium to the first-stage surface cooler 421 and switch the first cooling medium supply part to supply the cooling medium to the second-stage surface cooler 422.

In the embodiment, the first cooling medium supply part is a water source cooling tower capable of outputting normal-temperature water (namely, water having the same temperature as the local environment). The second cooling medium supply part can output chilled water. A water tank is connected with the heat pump system module 6 to form the second cooling medium supply part. Or, the heat pump system module 6 is directly used as the second cooling medium supply part, and the heat pump system module 6 is directly connected with the second-stage surface cooler 422.

In the working process of the temperature-lowering and dehumidifying module 4, the temperature of the cooling medium of the first-stage surface cooler 421 is higher than that of the second-stage surface cooler 422. Optionally, the temperature of the cooling medium of the first-stage surface cooler 421 may be 20° C. to 30° C., and the temperature of the cooling medium of the second-stage surface cooler 422 may be 10° C. to 15° C.

However, the temperature of normal-temperature water will change greatly with the change of season and geographical location. For example, the temperature of the normal-temperature water supplied from the first cooling medium supply part is higher than that of the chilled water output from the second cooling medium supply part in summer in northern areas. However, in winter, the temperature of the normal-temperature water supplied from the first cooling medium supply part is lower than that of the chilled water output from the second cooling medium supply part.

When the temperature of the normal-temperature water is lower than that of the cooling medium supplied from the second cooling medium supply part, the switching part is used, the second cooling medium supply part is switched to the first-stage surface cooler 421 to supply the cooling medium, and the first cooling medium supply part is switched to the second-stage surface cooler 422 to supply the cooling medium. On one hand, the energy can be saved;

and on the other hand, the cooling medium supply pipeline of the equipment can be simplified.

Through the arrangement of the heat regenerator 43, the temperature of the dry cold air in the temperature-lowering and dehumidifying module 4 is prevented from being too low, resulting in a low-temperature quenching phenomenon when the dry cold air cools the materials in cooling box body modules 3. Meanwhile, through the arrangement of the heat regenerator 43, the temperature of the dry cold air can be better controlled, so that the temperature is close to the environment temperature as much as possible, and then the temperature of the materials after being cooled is compatible with the seasonal temperature to avoid energy waste.

Optionally, in the embodiment, the heat regenerator 43 can be of three forms. Firstly, water is used as a medium, and water at the outlet of the first-stage surface cooler 421 is used for heat regeneration; secondly, steam is used as a medium; and thirdly, an electric heating manner is adopted.

The air entering the temperature-lowering and dehumidifying module 4 is cooled and dehumidified by the first-stage surface cooler 421 and the second-stage surface cooler 422, and then is slightly warmed by the regenerator 43 to obtain the dry cold air.

Referring to FIG. 2, in the embodiment, the cooling module 5 is a vertical cooling machine module. The vertical cooling machine module comprises a feeding valve 517 and a cooling box body 511. The materials dried by the drying module 2 can enter the cooling box body 511 through the feed valve 517, and the cooling box body 511 can cool the materials. The feed valve 517 is installed above the cooling box body 511, and the feed valve 517 is arranged at an outlet in the lower end of the material conveying pipeline 8. The upper end of the material conveying pipeline 8 communicates with an opening in the lower part of the feeding box body 91.

In the embodiment, the cooling module 5 further comprises a material discharge mechanism 512, vertical cooling box body inlet air ducts 513, a blanking hopper 514 and a closed-air material discharge valve 515.

The air outlet of the vertical cooling machine module is connected to a return air adjusting valve 71 through a return air duct 7; and the vertical cooling box body inlet air duct 513 of the vertical cooling machine module is connected with the outlet of the temperature-lowering and dehumidifying module 4. The material discharge mechanism 512 is arranged at the lower end of the cooling box body 511, and the blanking hopper 514 is arranged at the lower end of the material discharge mechanism 512. The vertical cooling box body inlet air ducts 513 are arranged on the two sides of the blanking hopper 514. The closed-air material discharge valve 515 is arranged at the lower end outlet of the blanking hopper 514.

The inlet of the vertical cooling box body inlet air duct 513 is connected to the outlet of the temperature-lowering and dehumidifying module 4. Optionally, an air supplementing device 516 is arranged on each of the two sides of the vertical cooling box body inlet air duct 513.

In the embodiment, the material drying and cooling integrated machine further comprises a rack, and the cooling module 5, the dust removal filter module 3, the air supplementing devices 516 and the temperature-lowering and dehumidifying module 5 are all installed on the rack.

In order to ensure coordinated operation of various components of the material drying and cooling integrated machine, the material drying and cooling integrated machine further comprises an electrical control system, and the electrical control system is also installed on the rack.

The working process of the material drying and cooling integrated machine provided by the embodiment is as follows:

The dry hot air generated in the heating module 1 is conveyed into the drying module 2 through the drying and circulating fan 14. The materials in the drying module 2 are dried. Moisture in the materials is carried away by the dry hot air, and the dry hot air is changed into the damp hot air.

After the damp hot air enters the heating module 1, part of the damp hot air continues to enter the heating module 1 and is treated by the heating module 1 to be changed into dry hot air again, and the dry hot air is conveyed into the drying module again by the drying and circulating fan 14.

The other part of the damp hot air enters the dust removal filter module 3 through the dehumidifying air duct air door adjusting valve 61 and the dehumidifying air duct 6 sequentially. Dust is removed by the dust removal filter module 3 to form clean air. The clean air is sent to the temperature-lowering and dehumidifying module 4 by the dehumidifying and cooling fan 32 for temperature lowering and dehumidification, and micro heat regeneration is conducted to form the dry cold air. The dry cold air enters the blanking hopper 514 through the vertical cooling box body inlet air duct 513, and passes through the material discharge mechanism 512 and a material layer, so that the materials are cooled. Meanwhile, the dry cold air is heated by the materials, then passes through the return air duct 7 and the return air adjusting valve 71 so as to enter the air duct of the drying module 2, and then enters the heating module 1 to be heated. Moreover, the next drying and cooling cycle is started.

Embodiment II

Figure 3:
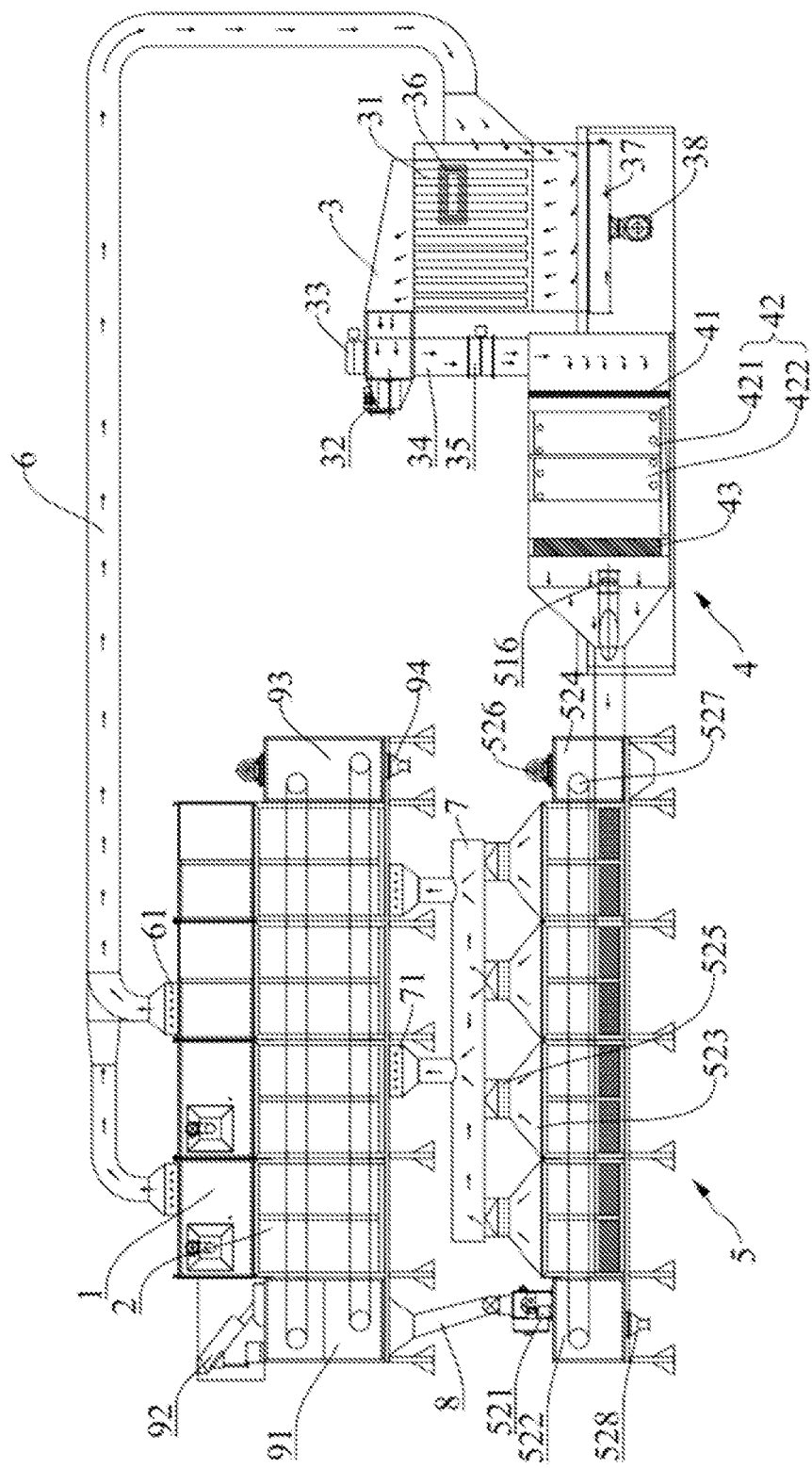
FIG. 3 is a front view of a material drying and cooling integrated machine provided by the second embodiment of the present disclosure.
Figure 4:
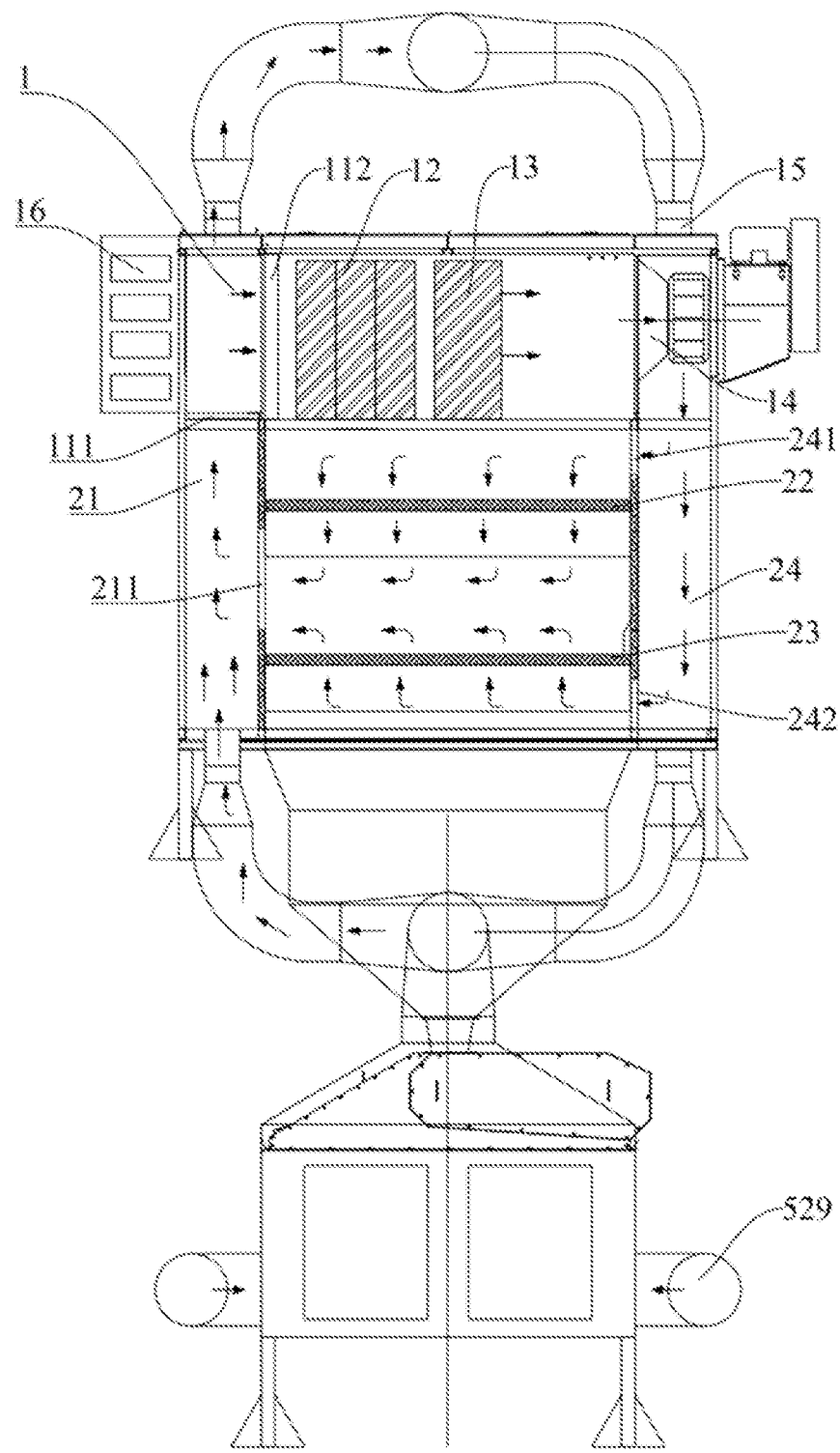
FIG. 4 is an internal structural schematic diagram of a material drying and cooling integrated machine in the side-looking direction provided by the second embodiment of the present disclosure.

FIG. 3 and FIG. 4 indicate the second embodiment in which the same or corresponding parts as those of the first embodiment are given the same reference signs as those of the first embodiment. For simplicity, only the difference between the second embodiment and the first embodiment is described.

The difference between the embodiment and the first embodiment lies in that the cooling module 5 is a horizontal cooling machine module.

In the embodiment, the vertical cooling machine module comprises a homogenizer 521 and cooling box body modules 523. The materials dried by the drying module 2 can enter the cooling box body modules 523 through the homogenizer 521, and the cooling box body modules 523 can cool the materials.

Optionally, in the embodiment, the homogenizer 521 is a closed-air homogenizer.

In the embodiment, the horizontal cooling machine module further comprises a cooling and feeding box 522, cooling box body modules 523, a cooling tail box 524, air outlet adjusting valves 525, a material conveying and driving device 526, a material conveying mechanism 527, a waste conveyor 528 and a horizontal cooling box body inlet air duct 529.

Optionally, in the embodiment, the cooling box body module 523 is provided with a plurality of horizontal cooling box bodies. The outlet of each horizontal cooling box body is provided with the corresponding air outlet adjusting valve 525. The air outlet adjusting valves 525 of the horizontal cooling box bodies are all connected to the return air duct 7.

The cooling and feeding box 522, the cooling box body modules 523 and the cooling tail box 524 are sequentially connected along the horizontal direction. The homogenizer 521 is arranged above the cooling and feeding box 522, and the upper part of the homogenizer 521 is connected to the material conveying pipeline 8.

In the embodiment, the air outlet adjusting valves 525 of the horizontal cooling machine module are connected to the return air adjusting valve 71 through the return air duct 7. The horizontal cooling box body inlet air duct 529 of the horizontal cooling machine module is connected with the outlet of the temperature-lowering and dehumidifying module 4. The upper end of the material conveying pipeline 8 communicates with the opening in the lower part of the feeding box body 91. The material conveying mechanism 527 penetrates through the cooling box body modules 523. One end of the material conveying mechanism 527 is located in the cooling and feeding box 522, and the other end of the material conveying mechanism 527 is located in the cooling tail box 524. The material conveying and driving device 526 is installed on the cooling tail box 524 so as to drive the material conveying mechanism 527. The horizontal cooling box body inlet air duct 529 penetrates through the cooling box body modules 523, and the inlet of the horizontal cooling box body inlet air duct 529 is connected to the outlet of the temperature-lowering and dehumidifying module 4. Optionally, an air supplementing device 529 is arranged on each of the two sides of the horizontal cooling box body inlet air duct 529.

The working process of the material drying and cooling integrated machine provided by the embodiment is as follows:

The dry hot air generated in the heating module 1 is conveyed into the drying module 2 through the drying and circulating fan 14. The materials in the drying module 2 are dried. Moisture in the materials is carried away by the dry hot air, and the dry hot air is changed into the damp hot air.

After the damp hot air enters the heating module 1, part of the damp hot air continues to enter the heating module 1 and is treated by the heating module 1 to be changed into dry hot air again, and the dry hot air is conveyed into the drying module again by the drying and circulating fan 14. The other part of the damp hot air enters the dust removal filter module 3 through the dehumidifying air duct air door adjusting valve 61 and the dehumidifying air duct 6 sequentially. Dust is removed by the dust removal filter module 3 to form clean air. The clean air is sent to the temperature-lowering and dehumidifying module 4 by the dehumidifying and cooling fan 32 for temperature lowering and dehumidification, and micro heat regeneration is conducted to form the dry cold air. The dry cold air enters the cooling box body modules 523 through the horizontal cooling box body inlet air duct 529, and passes through a material layer, so that the materials are cooled. Meanwhile, the dry cold air is heated by the materials, then passes through the return air duct 7 and the return air adjusting valve 71 so as to enter the air duct of the drying module 2, and then enters the heating module 1 to be heated. Moreover, the next drying and cooling cycle is started.

What is claimed is:

1. A material drying and cooling integrated machine, comprising a heating module, a drying module, a dust removal filter module, a temperature-lowering and dehumidifying module, and a cooling module, wherein dry hot air generated in the heating module can enter the drying module to dry materials in the drying module; the dust removal filter module can conduct dust removal on air entering an interior thereof; the temperature-lowering and dehumidifying module can conduct temperature lowering and dehumidification on air entering the interior thereof so as to form dry cold air, and the dry cold air can enter the cooling module to cool materials in the cooling module;

the dry hot air enters the drying module to dry the materials in the drying module, then damp hot air is formed, the damp hot air can enter the heating module, and part of the damp hot air can be heated by the heating module again and then enter the drying module; and an other part of the damp hot air can sequentially pass through the dust removal filter module and the temperature-lowering and dehumidifying module, dry cold air can be formed, and the dry cold air can enter the cooling module.

2. The material drying and cooling integrated machine according to claim 1, wherein the dry cold air is heated by the materials in the cooling module while the materials in the cooling module are cooled, and then enters the heating module through the drying module.

3. The material drying and cooling integrated machine according to claim 2, further comprising a return air duct, wherein one end of the return air duct can communicate with the drying module, and an other end of the return air duct communicates with the cooling module; and the dry cold air heated by the materials in the cooling module can enter the drying module through the return air duct.

4. The material drying and cooling integrated machine according to claim 1, wherein the temperature-lowering and dehumidifying module comprises a first-stage surface cooler and a second-stage surface cooler, a material drying and cooling equipment further comprises a first cooling medium supply part and a second cooling medium supply part, the first cooling medium supply part is used for supplying a cooling medium to the first-stage surface cooler, and the second cooling medium supply part is used for supplying a cooling medium to the second-stage surface cooler; and the material drying and cooling equipment further comprises a switching part, and the switching part can switch the second cooling medium supply part to supply the cooling medium to the first-stage surface cooler and switch the first cooling medium supply part to supply the cooling medium to the second-stage surface cooler.

5. The material drying and cooling integrated machine according to claim 1, further comprising a dehumidifying air duct, wherein one end of the dehumidifying air duct can communicate with the heating module, and an other end of the dehumidifying air duct communicates with the dust removal filter module; and the damp hot air entering the dust removal filter module can enter the dust removal filter module through the dehumidifying air duct.

6. The material drying and cooling integrated machine according to claim 5, wherein a dehumidifying air duct air door adjusting valve is arranged at a joint of the heating module and a dehumidifying air duct, and can adjust whether the dehumidifying air duct pipe communicates with the heating module or not.

7. The material drying and cooling integrated machine according to claim 1, wherein the cooling module is a vertical cooling machine module, the vertical cooling machine module comprises a feeding valve and a cooling box body, the materials dried by the drying module can enter the cooling box body through the feeding valve, and the cooling box body can cool the materials.

8. The material drying and cooling integrated machine according to claim 1, wherein the cooling module is a horizontal cooling machine module, the horizontal cooling machine module comprises a homogenizer and cooling box body modules, the materials dried by the drying module can enter the cooling box body modules through the homogenizer, and the cooling box body modules can cool the materials.

9. The material drying and cooling integrated machine according to claim 1, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

10. The material drying and cooling integrated machine according to claim 1, wherein the dust removal filter module comprises a dust removal box body and a dehumidifying and cooling fan, and the damp hot air entering the dust removal filter module sequentially passes through the dust removal box body and the dehumidifying and cooling fan.

11. The material drying and cooling integrated machine according to claim 2, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

12. The material drying and cooling integrated machine according to claim 3, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

13. The material drying and cooling integrated machine according to claim 4, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

14. The material drying and cooling integrated machine according to claim 5, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

15. The material drying and cooling integrated machine according to claim 6, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

16. The material drying and cooling integrated machine according to claim 7, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

17. The material drying and cooling integrated machine according to claim 8, further comprising a material conveying pipeline, wherein one end of the material conveying pipeline can communicate with the drying module, and an other end of the material conveying pipeline communicates with the cooling module; and the materials dried by the drying module can enter the cooling module through the material conveying pipeline.

18. The material drying and cooling integrated machine according to claim 2, wherein the dust removal filter module comprises a dust removal box body and a dehumidifying and cooling fan, and the damp hot air entering the dust removal filter module sequentially passes through the dust removal box body and the dehumidifying and cooling fan.

19. The material drying and cooling integrated machine according to claim 3, wherein the dust removal filter module comprises a dust removal box body and a dehumidifying and cooling fan, and the damp hot air entering the dust removal filter module sequentially passes through the dust removal box body and the dehumidifying and cooling fan.

20. The material drying and cooling integrated machine according to claim 4, wherein the dust removal filter module comprises a dust removal box body and a dehumidifying and cooling fan, and the damp hot air entering the dust removal filter module sequentially passes through the dust removal box body and the dehumidifying and cooling fan.

* * * * *